(12) United States Patent
Mehtupciu-Ionescu (10) Patent No.: US 8,439,000 B1
(45) Date of Patent: May 14, 2013

(54) PET DIAPER HOLDER USING DISPOSABLE HUMAN DIAPERS

(76) Inventor: Elena Mehtupciu-Ionescu, Mississauga (CA)

( * ) Notice: Subject to any disclaimer, the term of this patent is extended or adjusted under 35 U.S.C. 154(b) by 0 days.

(21) Appl. No.: 13/438,134

(22) Filed: Apr. 3, 2012

(51) Int. Cl.
*A01K 23/00* (2006.01)
(52) U.S. Cl.
USPC .......................... 119/868; 119/869; 119/850
(58) Field of Classification Search .................. 119/868, 119/867, 869, 853, 854, 838, 850; 604/393, 604/394, 395, 397, 399, 401, 402
See application file for complete search history.

(56) References Cited

U.S. PATENT DOCUMENTS

| | | | | | |
|---|---|---|---|---|---|
| 2,575,165 | A | * | 11/1951 | Donovan | 604/394 |
| 3,407,813 | A | * | 10/1968 | Grippo et al. | 604/398 |
| 4,813,949 | A | * | 3/1989 | O'Rourke | 604/391 |
| 4,955,880 | A | * | 9/1990 | Rodriquez | 604/393 |
| 4,996,949 | A | * | 3/1991 | Wunderman et al. | 604/390 |
| 5,368,585 | A | * | 11/1994 | Dokken | 604/393 |
| 5,613,959 | A | * | 3/1997 | Roessler et al. | 604/364 |
| 5,662,640 | A | * | 9/1997 | Daniels | 604/392 |
| 5,934,226 | A | * | 8/1999 | Moore et al. | 119/868 |
| 6,368,313 | B1 | * | 4/2002 | Howard | 604/385.09 |
| 6,557,497 | B1 | * | 5/2003 | Milligan | 119/850 |
| 6,675,745 | B1 | * | 1/2004 | Brewington | 119/869 |
| 6,837,191 | B2 | * | 1/2005 | Brewington | 119/869 |
| 6,935,278 | B2 | * | 8/2005 | Brewington | 119/869 |
| 7,174,860 | B2 | * | 2/2007 | Solomon | 119/869 |
| 7,464,668 | B2 | * | 12/2008 | Brewington | 119/869 |

* cited by examiner

*Primary Examiner* — Yvonne Abbott
(74) *Attorney, Agent, or Firm* — Mirek A. Waraksa (57) ABSTRACT

A pet diaper holder uses disposable human diapers. The diaper holder includes upper and lower flexible holder portions joined at one side. The upper holder portion overlays the rump of the animal, including the base of the animal's tail. The lower holder portion holds the diaper against the belly and groin area of the animal, and extends between the animal's rear legs to overlay the base of the animal's tail from below. The upper and lower holder portions define a rearward opening through which the tail of the animal protrudes and openings surrounding the rear legs of the animal. Snap-fitting male and female connectors join the holder portions at an openable side and at the opening surrounding the base of the tail, and fasten the waistbands associated with the diaper to the lower holder portion thereby avoiding shifting and balling of the diaper with movement of the animal.

1 Claim, 8 Drawing Sheets

PET DIAPER HOLDER USING DISPOSABLE HUMAN DIAPERS

FIELD OF THE INVENTION

The invention relates to diaper holders for incontinent animals, which use conventional disposable human diapers.

BACKGROUND OF THE INVENTION

Both dog diapers and garments for holding absorbent pads against the underside of a dog are known.

A dog diaper is disclosed in U.S. Pat. No. 6,142,105 to McKnight. The McKnight diaper is essentially a short pant with top, bottom and elasticized side panels that fit snugly to the dog's torso, and an absorbent portion adjacent the bottom panel. The pant is constructed with elasticized openings to receive the dog's rear leg and an elasticized circular opening for receiving the dog's tail. Shoulder-engaging straps are used to secure forward portions of the panel assembly to the animal. There are several shortcomings to such a diaper. Particularly with an old, incontinent dog, it may be difficult to work the animal's legs and tail through the openings provided when installing the diaper. Also, even if a removable absorbent pad were used, it would be difficult to replace the pad, particularly after defecation, without extensively soiling the diaper holder itself, and it would be desirable to avoid extensive washing of the holder itself. As well, the elasticized garment tends to press against the dog's bladder which is undesirable.

Another variant of a dog diaper is disclosed in U.S. Pat. Nos. 6,667,754, 6,837,191, 6,935,278 and 7,464,668 to Brewington. The invention includes an absorbent garment, essentially an elasticized short pant, that fits snugly to the dog's torso. A special bib strap perforated to form two strap lengths is used to secure forward portions of the garment to the dog. Openings are provided through which a dog's tail and legs can be inserted while installing the absorbent garment. Once again, it is difficult, particularly with an old dog, to insert its legs and tail through the openings provided when installing the garment. Also, extensive washing would be required, should the dog urinate or defecate in the garment. As well, the garment tends to press against the dog's bladder which is once again undesirable.

A garment for holding an absorbent pad against the underside of a dog is disclosed in U.S. Patent Application No. 2001/0226193. The garment includes flexible upper and lower panels that can be located about the dog's torso. Releasable fasteners at one open side of the pair of panels permit the girth of the garment to be adjusted to accommodate the size of the dog. Straps and a connecting ring that locates about the tail of the animal permit fastening of the garment to the rump of the animal, which is an awkward arrangement. Another problem is that special pads must be used, which would be comparatively expensive. Should an attempt be made to use a disposable human diaper, which is not suggested by the prior published patent application, the diaper would be subject to balling and displacement with movement of the dog, making it an unreliable means for collecting urine and feces.

SUMMARY OF THE INVENTION

The invention provides a dog diaper holder adapted to removably retain a disposable human diaper. Since disposable human diapers are produced in great volume, there are economies of scale and such diapers are relatively inexpensive.

In one aspect, the invention provides a pet diaper holder adapted to hold a disposable human diaper with a pair of waistbands and an absorbent pad fastened to and extending between the waistbands. The diaper holder includes upper and lower flexible holder portions. The upper holder portion is shaped to overlay the rump of the animal from above, including the base of the animal's tail. The lower holder portion is attached to the upper holder portion at one side of the holder and shaped to overlay the belly and groin area of the animal from below, extending between the animal's rear legs to overlay the base of the animal's tail from below. The lower flexible holder portion is shaped to receive the diaper in a flat, fully opened, operative orientation between the lower holder portion and the belly and groin area of the animal with one of the waistbands of the diaper located forward on the lower holder portion and with the opposing waistband located rearward on the lower holder portion. The upper and lower holder portion define, when located about the torso of the animal, a rearward opening through which the tail of the animal can protrude and openings surrounding the rear legs of the animal. The upper and lower holder portions meet and are separable along one side of the animal and the rear end of the animal. Manually-operable fastener means are provided for releasable joining of the upper and lower holder portions at the openable side of the holder and at the opening surrounding the base of the tail and for fastening the waistbands of the diaper to the lower holder portion in its operative orientation.

Installation does not require the animal's legs and tail to be threaded through specially provided openings or devices, and the diaper can be easily located in a fully flat open orientation on the lower holder portion before the upper and lower holder portion are secured to one another. Removal of a used diaper simply involves releasing the lower holder portion from the upper holder portion and the diaper, and this overall arrangement avoids undue wetting or soiling of the diaper holder itself. Securing the diaper to the lower holder portion in its operative orientation avoids shifting or balling up of the diaper with movement of the animal. The fasteners used may in fact serve double duty: securing the lower holder portion to the holder upper portion and also attaching the waistbands associated with the diaper to the lower housing portion, pinching the waistbands between the upper and lower holder portions. Separate fasteners can, however, be used to secure the diaper in its operative orientation but it is preferred to reduce the number of fasteners. Shoulder straps are preferred to hold the forward end of the upper and lower holder portions in position on the animal, rather than providing a tight fit about the torso of the animal. The straps can be permanently fastened to one of the upper and lower holder portions (preferably to the upper holder portion), crossed, and releasably fastened to the other of the upper and lower holder portions, as with snap fasteners.

Various aspects of the invention will be apparent from a description below of a preferred embodiment and will be more specifically defined in the appended claims.

DESCRIPTION OF THE DRAWINGS

The invention will be better understood with reference to drawings in which.

DESCRIPTION OF PREFERRED EMBODIMENT

Figure 1:
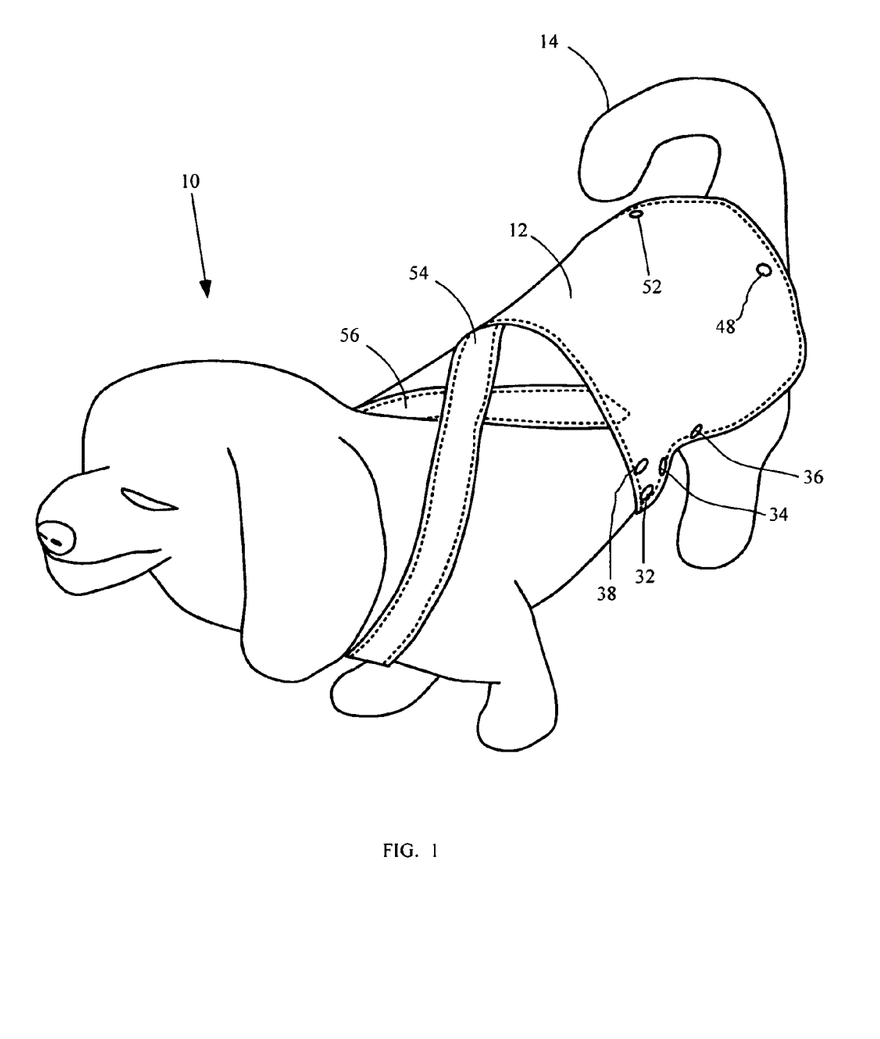
FIG. 1 is perspective view of a diaper holder with upper and lower flexible cloth holder portions operatively located on a dog and shoulder straps fully installed.

Reference is made to FIG. 1 which illustrates a dog diaper holder operatively mounted to a dog 10. The diaper holder includes an upper flexible, cloth holder portion 12 shaped to overlay the rump of the dog 10 and to extend rearward to overlay the base of the dog's tail 14. A lower flexible, cloth holder portion 16 (apparent in FIGS. 5 and 6) is shaped to cover the belly and groin area of the dog 10. The lower holder portion 16 also extends rearward between the rear legs of the dog 10 to overlay the base of the dog's tail 14 from below (as more apparent in FIGS. 2 and 3).

Figure 7:
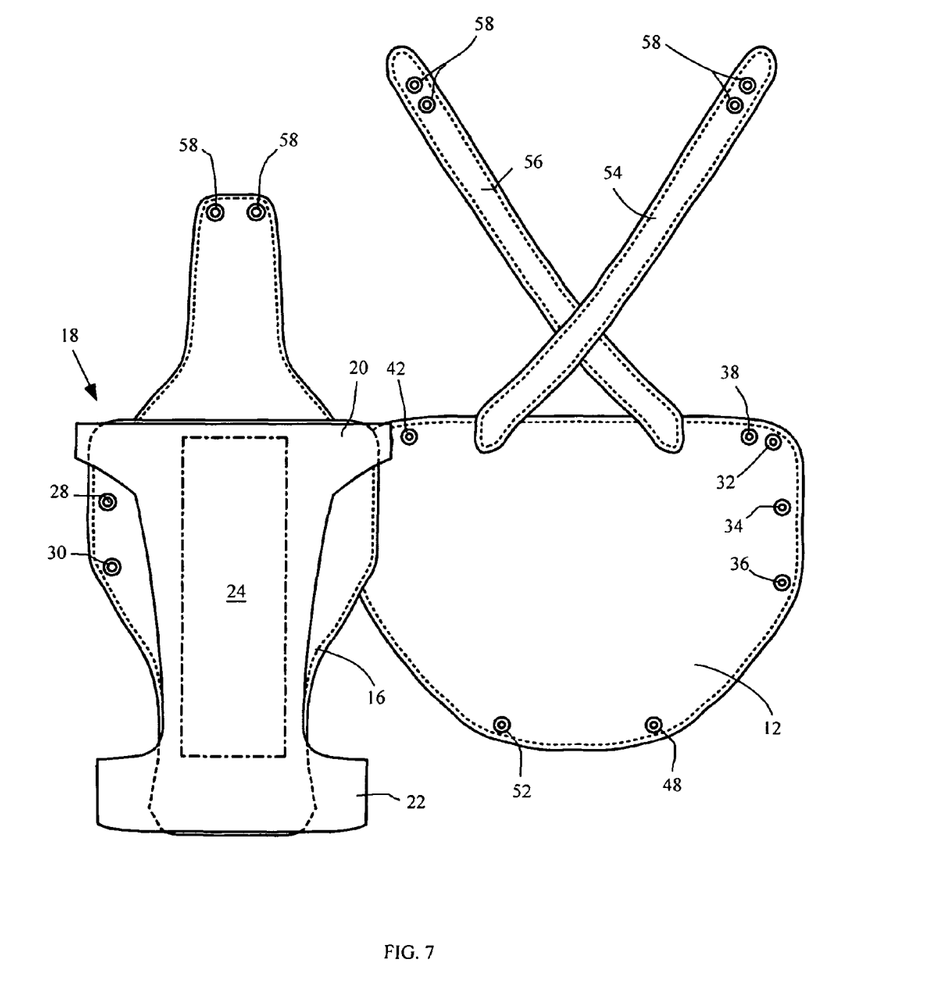
FIG. 7 is a plan view comparable to that of FIG. 6 showing the diaper in its fully open operative position against the lower holder portion in an orientation most suitable for use with a male dog; and, FIG. 8 is a plan view comparable to that of FIG. 7 showing the diaper in another operative position against the lower holder portion more suited for use with a female dog.
Figure 8:
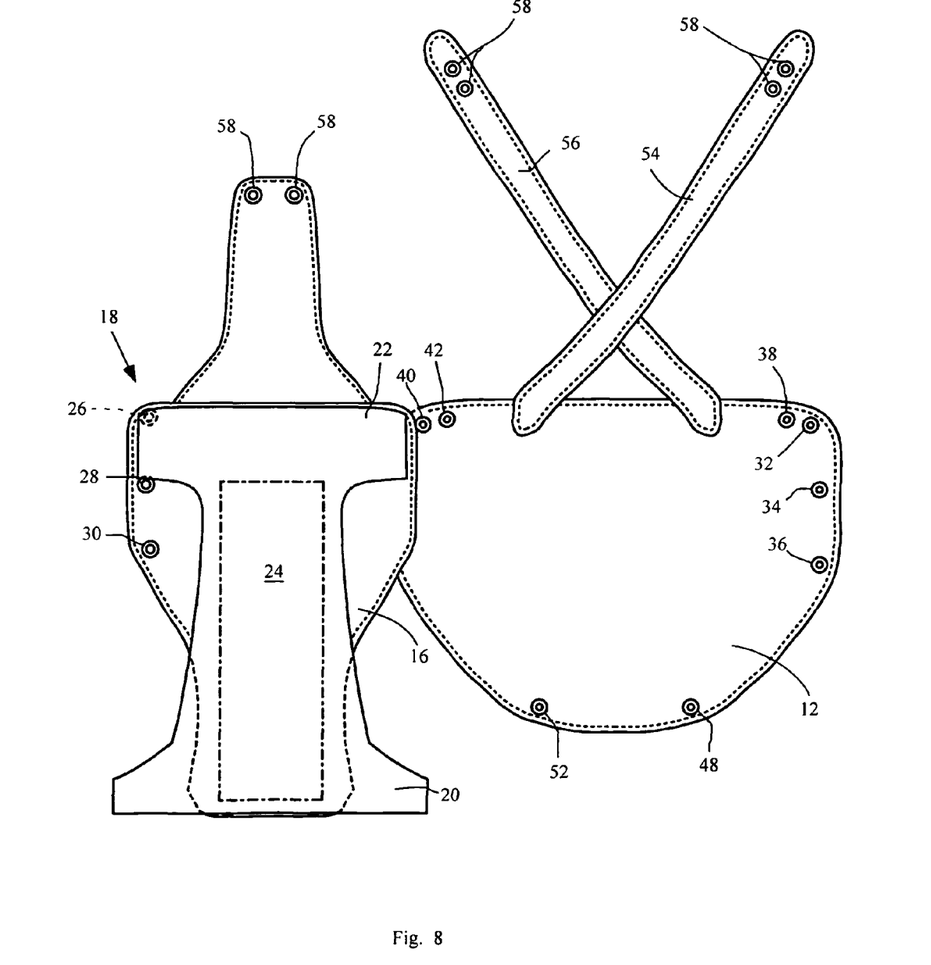

FIGS. 7 and 8 show a conventional disposable human baby diaper 18 in an operative fully open orientation in which the diaper 18 can be retained by the diaper holder. The diaper 18 has a pair of opposing waistbands 20, 22 and an absorbent pad 24 fastened to and extending between the waistbands 20, 22. It should be noted that one waistband 20 is narrower and the other waistband 22 is considerably broader. This construction is characteristic of a conventional disposable child diaper, and has not been designed specifically for the dog diaper holder. The different widths of the waistbands 20, 22 are exploited as described more fully below to accommodate male or female dogs differently.

Figure 3:
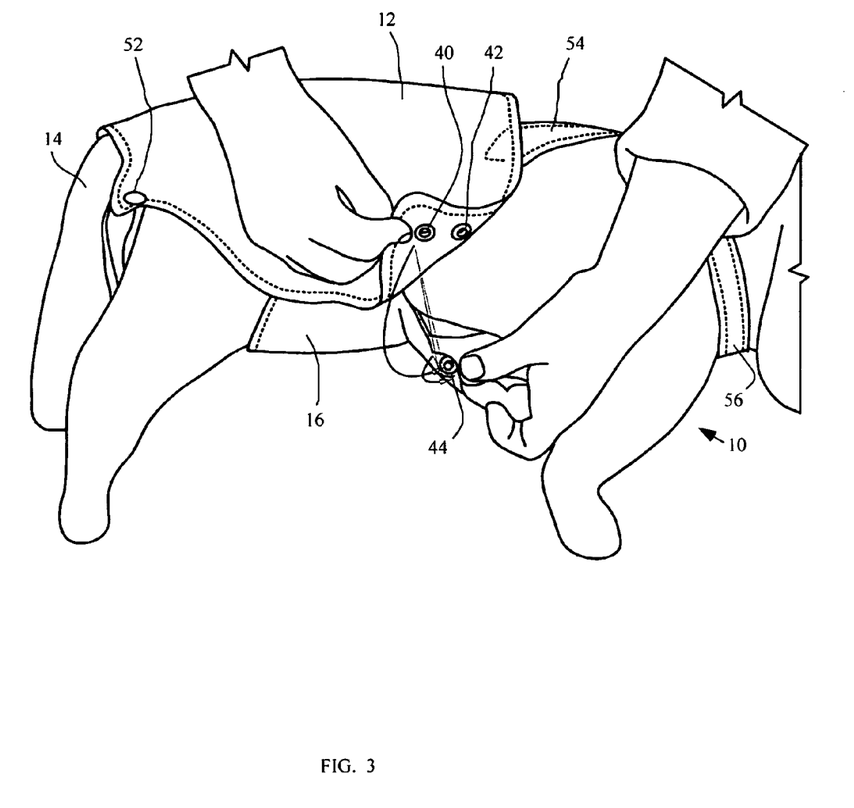
FIG. 3 is a partially fragmented perspective view of the diaper holder partially installed on the dog and showing one side of the holder on the right side of the dog, where the upper and lower holder portions are sewn together, and showing snap fasteners in the upper and lower holder portions used in part to retain a forward located waistband of the diaper.
Figure 4:
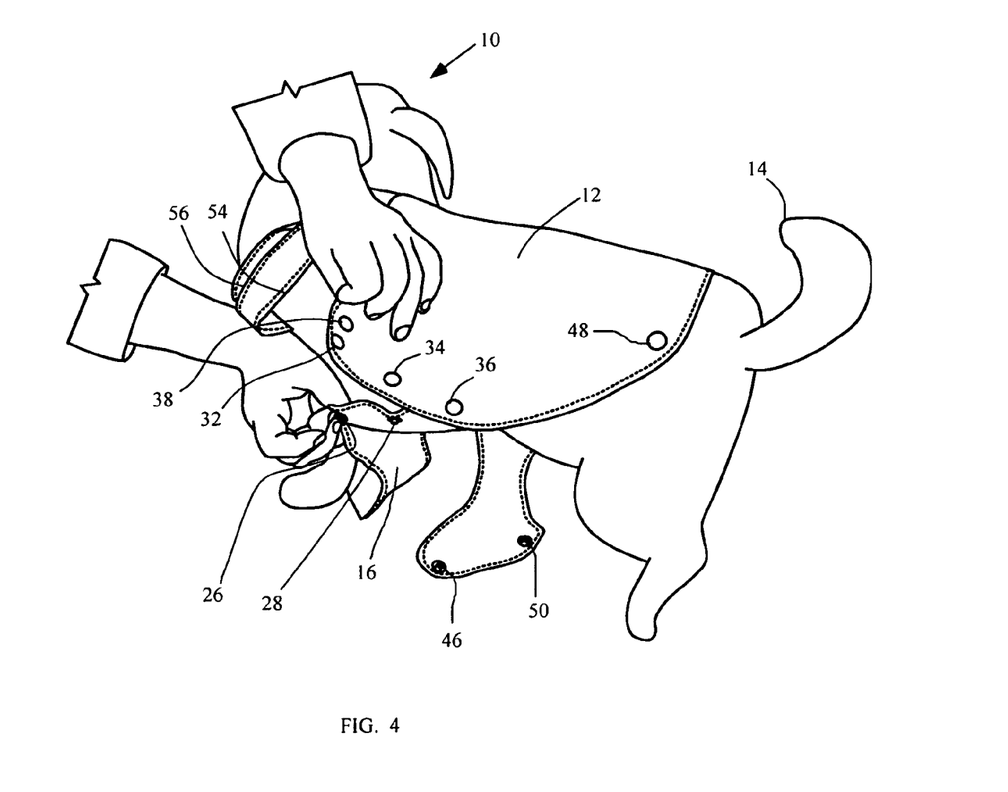
FIG. 4 is a partially fragmented perspective view of the diaper holder partially assembled on the dog and showing an openable side of the holder on the left side of the dog and snap fasteners in the upper and lower holder portions used to close the openable side of the holder and in part to secure the forward waistband of the diaper.
Figure 5:
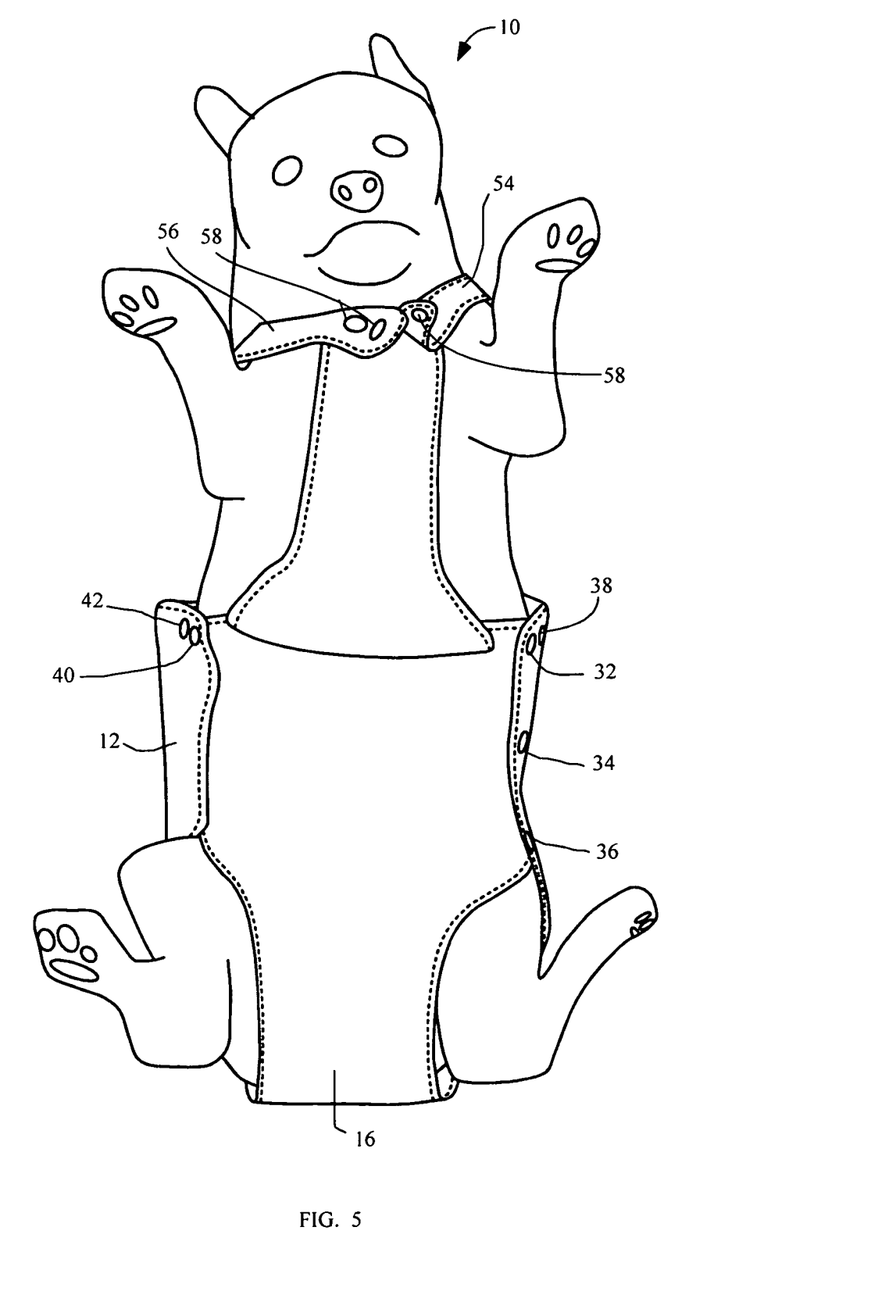
FIG. 5 is a plan view showing how the holder positions on the underside of the dog and how shoulder straps fasten to the bottom holder portion.
Figure 6:
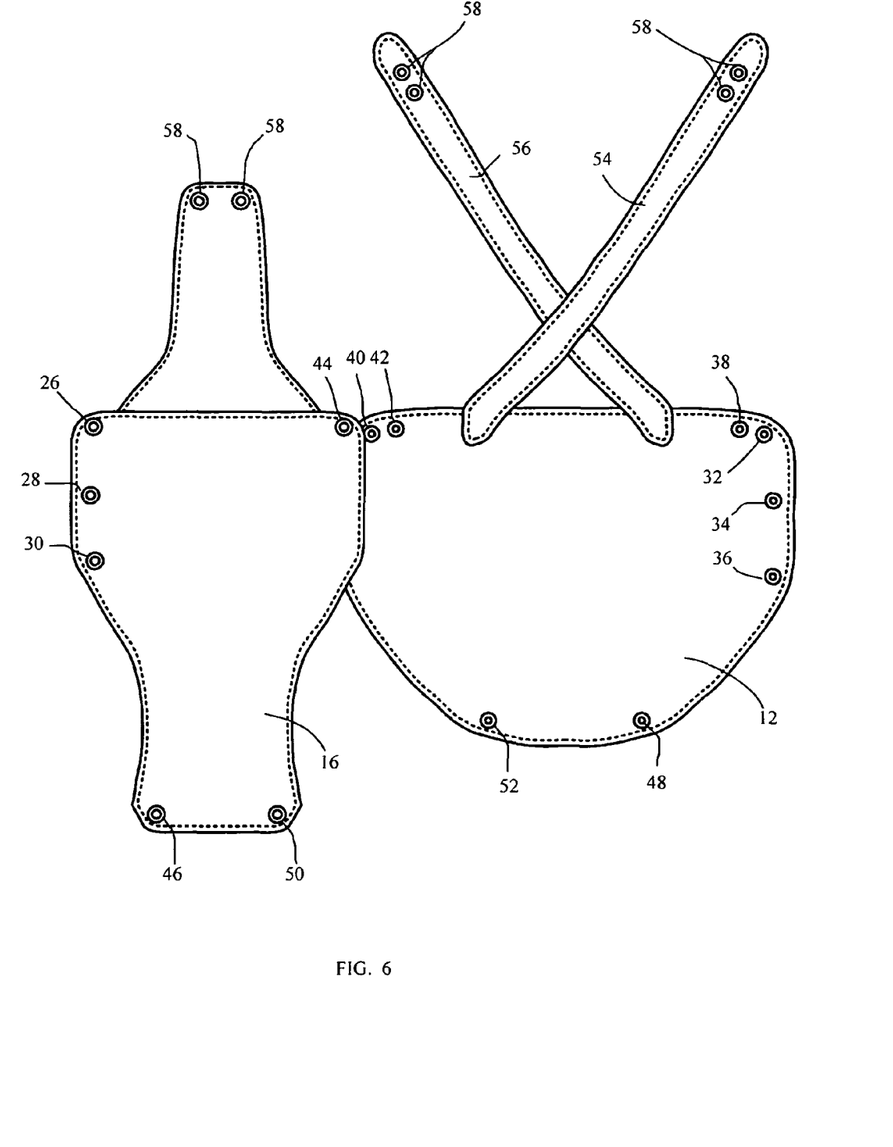
FIG. 6 is a plan view of the upper and lower holder portions fully opened to reveal interior surfaces and the position of male and female snap fasteners.

As apparent in FIGS. 3, 5 and 6, the lower holder portion 16 is permanently fastened to the upper holder portion 12 by sewing along one side of the holder, To install the diaper holder, the upper holder portion 12 is rested on the rump area of the dog 10 and the lower holder portion 16 is spread under the belly and groin area of the dog 10 to achieve the orientation apparent, for example, in FIGS. 4 and 5. As apparent in FIGS. 7 and 8, the lower holder portion 16 is shaped to receive the child's diaper 18 in a fully open, flat orientation and to locate the diaper 18 in its operative fully open orientation against the belly and groin area of the dog 10, during installation of the diaper holder. In FIG. 7, the narrower waistband 20 is located forward against the lower holder portion 16, and the wider waistband 22 is located rearward against the lower holder portion 16. The wider waistband 22 being positioned rearward in the lower holder portion 16 better accommodates urination from a male dog 10, positioning the absorbent pad 24 to accommodate the dog's penis which is normally located a considerable distance forward of the dog's rectum or the base of its tail 14. Consequently, any urine flow through the penis of the dog 10 is directed immediately into the absorbent pad 24 for rapid collection.

Several aspects of the diaper holder in its closed orientation around the torso of the dog 10 should be noted. First, the upper and lower holder portions 12, 16 are shaped to meet and overlap at the left side of the animal defining an openable side of the holder, as apparent in FIG. 4. At the openable side, the upper and lower holder portions 12, 16 are fastened to one another with three pairs of releasable male-female snap fitting connectors. The male connectors 26, 28, 30 are fastened to the lower holder portion 16 along one side edge thereof. The female connectors 32, 34, 36 are fastened to the upper holder portion 12 along one side edge thereof. It should be noted that there is in fact another female connector 38 forward on the upper holder portion 12 to permit a bit of size accommodation. The forward pair of male-female connectors 26, 32 serve a dual purpose: they fasten the upper and lower holder portions 12, 16 together and they also engage the forward narrower waistband 20 of the diaper 18 to pinch one end of the waistband 20 between the upper and lower holder portions 12, 16, effectively fixing the position of the forward narrower waistband relative to the lower holder portion 16. Two female snap fit connectors 40, 42 are attached at a forward position on the upper holder portion 12 at the closed side of the diaper holder (as apparent in FIG. 3), and a single male snap connector 44 is positioned at a forward position on the lower holder portion 16 to be aligned with one of the two female snap fit connectors 40, 42. These are used to secure the opposite end of the narrower waistband 20 in its forward position relative to the lower diaper holder portion 16.

Figure 2:
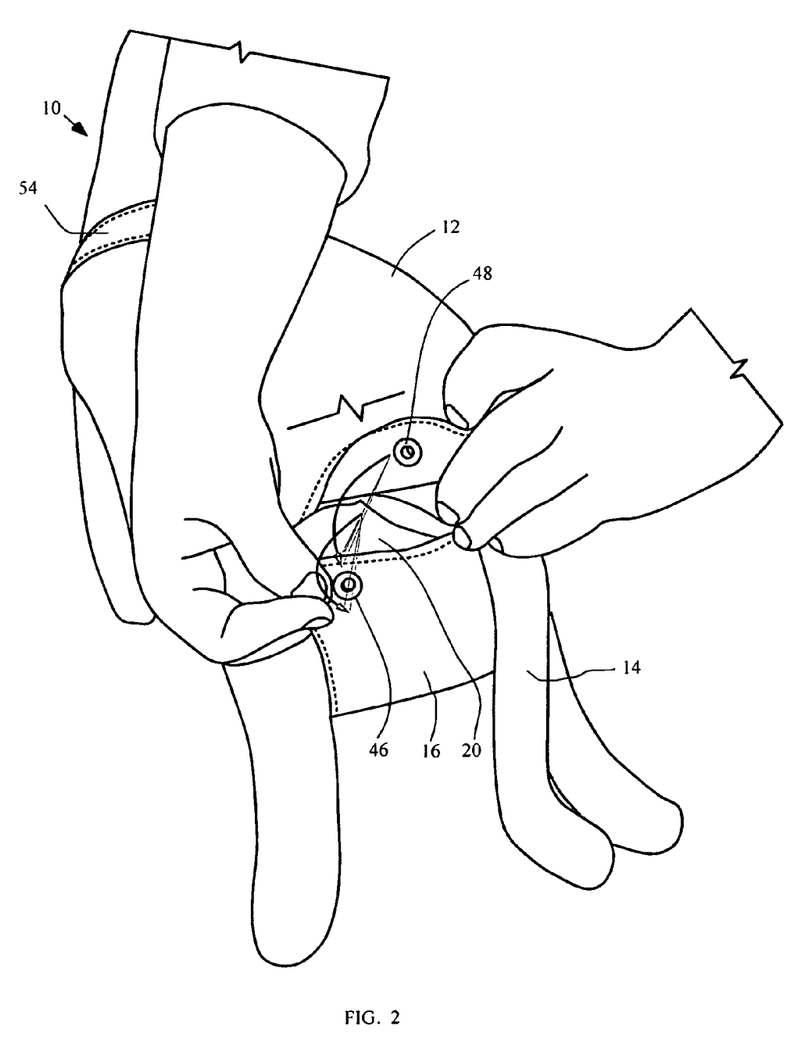
FIG. 2 is a partially fragmented perspective view from rear of the diaper holder showing the upper and lower holder portions overlaying the base of the dog's tail and defining an opening through which the tail extends, and male and female snap fasteners used to join the upper and lower holder portions at the tail opening and to pinch a rearward located waistband of the diaper between the upper and lower holder portions.

At the rear of the diaper holder, the upper and lower holder portions 12, 16 define an opening accommodating the dog's tail 14, as apparent in FIGS. 2 and 3. A pair of alignable male and female snap fit connectors 46, 48 is located on the upper and lower holder portions 12, 16 to one side of the opening and the base of the dog's tail 14. Another pair of alignable male and female snap fit connectors 50, 52 is located on the upper and lower holder portions 12, 16 to an opposite side of the opening and base of the dog's tail 14. The connectors 46, 48, 50, 52 snap fit together to perform two functions. First, they join and hold together the upper and lower holder portions 12, 16 at the rear end of the animal proximate to the dog's tail 14. Second, they pinch the wider rearward positioned waistband 22 of the diaper 18 between the upper and lower holder portions 12, 16, securing the rear end of the diaper 18 in stationary relationship relative to the lower holder portion 16. In cooperation with the forward male-female snap fasteners 26, 32, 40, 44, the diaper 18 is held to the lower holder portion 16 in its fully open orientation, and resists displacement or balling with movement of the animal. It should also be noted that in the closed orientation of the diaper holder about the dog 10, fully secured by the various male-female snap connectors, the holder portions 12, 16 cooperate to define openings (apparent but not numbered in FIG. 5) accommodating the rear legs of the animal. There is no need to somehow thread the legs or tail 14 of the animal through the various openings when installing the diaper holder or to somehow locate a ring or other device around the tail 14.

FIG. 8 shows the diaper 18 on the lower holder portion 16 in an orientation more suited for a female dog. More specifically, the narrower waistband 20 is positioned rearward in the lower holder portion 16, and the wider waistband 22 is positioned forward in the lower holder portion 16. This accommodates the position of a female dog's vagina, which is positioned more rearward on the animal's body, than is a male dog's penis. The absorbent pad 24 is thus positioned over the animal's vagina reducing the likelihood of leakage before absorption.

Although the upper and lower holder portions 12, 16 might be elasticized to allow a snug fit and to accommodate different dog sizes, it is preferred that the holder portions 12, 16 be slightly loose, avoiding placing pressure on the dog's bladder. Thus, diaper holders constructed according to the invention will be provided in different sizes (example, small, medium, large and extra-large) and subsizes depending on the dog's belly size. To better ensure that the slightly loose diaper holder remains properly positioned, a pair of shoulder straps 54, 56 are provided. Each shoulder strap 54 or 56 has one end sewn in a forward position on the upper holder portion 12, as apparent in FIG. 1. The straps 54, 56 are oriented to cross one another across the dog's back and to extend around the shoulders of the dog 10 toward a portion of the lower holder portion 16 that extends forward along the dog's chest, as apparent in FIG. 5. Male-female snap connectors 58 attached to the opposing ends of the straps 54, 56 and to the forward portion of the lower holder portion 16 permit the straps 54, 56 to be releasably fastened to the lower holder portion 16.

Various modifications may be considered. Although the upper and lower holder portions 12, 16 are sewn permanently to one side of the holder, releasable fasteners could be used to make such a connection, leaving two openable sides. In use, only one side of the holder is apt to be opened to locate about the torso of a dog. Velcro™ fasteners can be used to secure the upper and lower holder portions 12, 16 to one another. Snap fasteners are still preferred for securing the diaper 18 to the lower holder portion 16. Such snap fasteners may be connected entirely to the lower holder portion 16, as by mounting the male connectors on short, narrow straps extending from forward and rear edges of the lower holder portion 16 and mounting the corresponding female connects adjacent the forward and rear edges of the lower holder portion 16. The relative positions of the male and female connectors may be interchanged. It is still strongly preferred to get double-duty from whatever releasable fasteners are used, simultaneously joining the holder portions 12, 16 at the rear of the diaper holder and securing the rearward positioned waistband of the contained diaper 18 to the lower holder portion 16. Velcro™ fasteners may be used to releasably secure the straps 54, 56 to the lower holder portion 16, and the straps 54, 56 may be elasticized to more strongly engage the dog's shoulders.

It will be appreciated that a particular embodiment of the invention has been described and illustrated, and that modifications beyond those already suggested in this specification may be made without necessarily departing from the scope of the appended claims.

I claim:

1. A pet diaper holder for a four-legged animal with a tail, the diaper holder adapted to hold a human diaper flat against the belly and groin area of the animal, the human diaper having a pair of opposing elongate waistbands and an absorbent pad fastened to and extending between the opposing waistbands, the pet diaper holder comprising:

an upper flexible holder portion shaped to overlay the rump of the animal from above including the base of the animal's tail;

a lower flexible holder portion attached to the upper flexible holder portion and shaped to overlay the belly and groin area of the animal from below and extending between the animal rear legs to overlay the base of the animal's tail from below, the lower flexible holder portion shaped to receive the diaper in a flat fully open operative orientation between the lower holder portion and the belly and groin area of the animal with one of the waistbands of the diaper located forward on the lower holder portion and with the opposing waistband located rearward on the lower holder portion, the upper and lower holder portions shaped to define when located about the torso of the animal a rearward opening through which the tail of the animal can protrude and openings surrounding the rear legs of the animal, the upper and lower holder portions shaped to meet and to define an openable side of the holder extending along one side of the animal and the rear end of the animal; and, manually-operable fastener means for releasably joining the upper and lower holder portions at the openable side of the holder and at the opening surrounding the base of the tail and for fastening the waistbands of the diaper to the lower holder portion once the diaper is in its operative orientation between the lower holder portion and the belly and groin area of the animal, the fastener means comprising two forward pairs of snap fitting connectors positioned to engage spaced-apart portions of the forward waistband of the diaper and each of the forward pairs of snap fitting connectors comprising a female connector attached to one of the upper and lower holder portions and a male connector attached to the other of the upper and holder portions in general alignment with the female connector such that the forward waistband of the diaper can be pinched between the upper and lower holder portions when each of the forward pairs of snap fitting connectors are manually joined, and the fastener means comprising two rearward pairs of snap fitting connectors positioned to engage spaced-apart portions of the rearward waistband of the diaper and each rearward pair of snap fitting connectors comprising a female connector attached to one of the upper and lower holder portions and a male connector generally aligned with the female connector and attached to the other of the upper and holder portions such that the rearward waistband of the diaper can be pinched between the upper and lower holder portions when each of the rearward pairs of snap fitting connectors are manually joined.

* * * * *